UNITED STATES PATENT OFFICE.

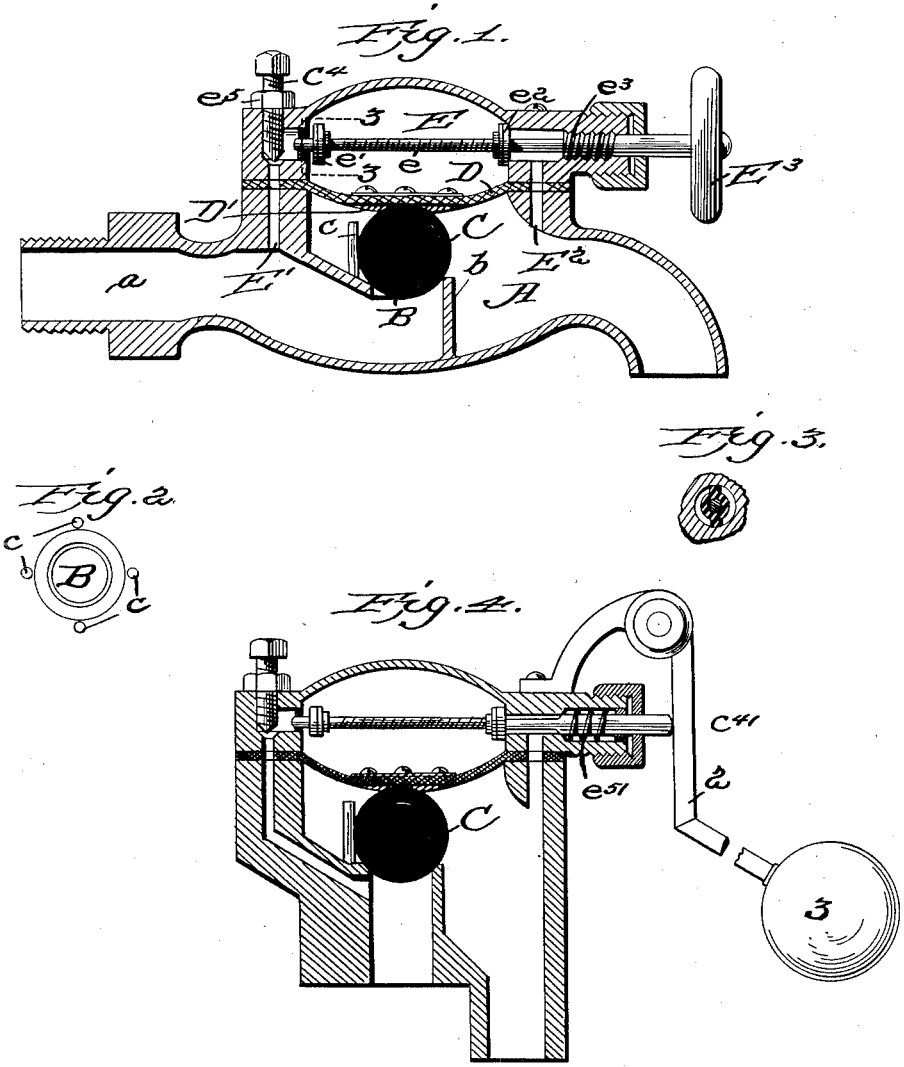

CHARLES GULLAND, OF PITTSBURG, PENNSYLVANIA.

VALVE.

SPECIFICATION forming part of Letters Patent No. 595,061, dated December 7, 1897.

Application filed June 17, 1897. Serial No. 641,175. (No model.)

*To all whom it may concern:*

Be it known that I, CHARLES GULLAND, a citizen of the United States, residing at Pittsburg, in the county of Allegheny and State of Pennsylvania, have invented certain new and useful Improvements in Valves, of which the following is a specification, reference being had therein to the accompanying drawings.

My invention relates to improvements in valves designed for use either as hand-operated or automatic valves; and the object of the invention is to provide a construction of improved form in which the pressure of the water shall operate to hold the valve firmly against its seat.

The invention is illustrated in the accompanying drawings, in which—

Figure 1 is a central longitudinal section through a valve adapted to be operated by hand. Fig. 2 is a detail view of the valve-seat. Fig. 3 is a section through the valve-stem on line 3 3. Fig. 4 is a view similar to Fig. 1, showing the valve designed to be operated by a float.

Referring more particularly to the form shown in the first three figures, A designates a faucet showing my improved valve applied thereto, the faucet having the usual threaded shank for attachment to the supply main or pipe. (Not shown.) Between the shank portion $a$ and the mouth of the faucet is located the valve-seat B, formed by the wall or flange $b$, and upon this valve-seat rests a vertically-acting valve C, preferably composed of a loose rubber ball guided in its vertical movement and retained against lateral displacement by vertical posts $c$.

The valve is held against its seat by the pressure of the water upon a flexible diaphragm D, having a surface of greater area than the diameter of the valve, the water being admitted to the chamber E above the diaphragm through a port or passage E' upon the inlet side of the valve. A similar port or passage $E^2$ is provided leading from the chamber E to the outlet or nozzle side of the faucet, and the ports E' and $E^2$ are controlled by valves $e'$ and $e^2$, carried upon a valve-stem $e$ and so arranged that when one valve is open the other is closed. The valves are prefer-
ably capable of adjustment upon the stem and are provided with soft washers, preferably of rubber.

The valve-stem is extended through the wall of the faucet and is preferably provided with a threaded portion $e^3$, engaging corresponding threads in the faucet-wall, so that when the stem is rotated in one direction or the other by the handle $E^3$ the valves $e'$ and $e^2$ will be moved to open and close their respective ports.

It will be readily understood that when the parts are in the position shown in Fig. 1 water will pass through the port $e'$, and owing to the port $e^2$ being closed will accumulate in the chamber E and press upon the diaphragm, and by reason of its greater surface will force the valve to its seat. When, however, it is desired to start the flow of water, the valve-stem is moved to close the inlet-port $e^2$, when the pressure upon the diaphragm is relieved and the valve allowed to open.

The quantity of water which flows from the faucet may be regulated at will by opening port $e'$ a greater or less distance, allowing more or less water to find its way to the chamber E and thus limiting the amount of opening of the ball-valve.

Further, the valve may be made to act more or less quickly in opening and closing by means of the regulating-screw $c^4$, which may be adjusted to vary the size of the inlet-port $e'$ and is locked in its adjusted position by a lock-nut $e^5$.

In order to prevent wear upon the diaphragm, I provide it upon its under side with a small brass plate D', which has a recessed or concaved portion to fit the ball.

In Fig. 4 the valve is shown adapted as a tank-valve, the arrangement of parts being substantially the same, except that in this form the supplemental valve-stem $c^{4'}$ is pressed upon by a coiled spring $e^{5'}$, which tends to hold the inlet-valve open and the exit-valve closed, and hence the ball-valve pressed against its seat. The stem is moved in the opposite direction against the pressure of the spring by the weight of a float 3, carried by a pivoted arm 2, bearing against the end of the stem, when the water-level in the tank falls, the rising of the float with the water serving to release the stem and allow it to move outward to close the valve.

Having thus described my invention, what I claim is—

1. In combination, the valve-seat, the loose ball-valve, guides for the ball, the diaphragm above the ball, the wear-plate carried by said diaphragm, the chamber above the diaphragm having inlet and exhaust ports, and the supplemental valves controlling said ports, substantially as described.

2. In combination the valve-seat, the loose ball-valve, guides therefor, the diaphragm adapted to bear on the ball, the chamber above the diaphragm having inlet and exhaust ports at opposite sides thereof, the reciprocating valve-stem, and the supplemental valves carried by said stem and adapted to open and close said inlet and outlet ports, substantially as described.

In testimony whereof I affix my signature in presence of two witnesses.

CHARLES GULLAND.

Witnesses:
JOHN A. WILSON,
JAMES SMITH.